United States Patent
Bose et al.

(10) Patent No.: US 7,774,654 B2
(45) Date of Patent: *Aug. 10, 2010

(54) METHOD AND APPARATUS FOR PREVENTING SOFT ERROR ACCUMULATION IN REGISTER ARRAYS

(75) Inventors: Pradip Bose, Yorktown Heights, NY (US); Jude A. Rivers, Cortlandt Manor, NY (US); Balaram Sinharoy, Poughkeepsie, NY (US); Victor Zyuban, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 196 days.

This patent is subject to a terminal disclaimer.

(21) Appl. No.: 12/051,904

(22) Filed: Mar. 20, 2008

(65) Prior Publication Data

US 2008/0313509 A1 Dec. 18, 2008

Related U.S. Application Data

(63) Continuation of application No. 11/374,871, filed on Mar. 14, 2006, now Pat. No. 7,493,523.

(51) Int. Cl.
*G06F 11/00* (2006.01)

(52) U.S. Cl. .................................. 714/38
(58) Field of Classification Search ............. 714/0.38
See application file for complete search history.

(56) References Cited

U.S. PATENT DOCUMENTS

| | | | | |
|---|---|---|---|---|
| 5,263,032 A * | 11/1993 | Porter et al. | ............. | 714/764 |
| 5,495,491 A * | 2/1996 | Snowden et al. | ............. | 714/764 |
| 6,629,266 B1 * | 9/2003 | Harper et al. | ............. | 714/38 |
| 6,810,495 B2 * | 10/2004 | Castelli et al. | ............. | 714/47 |
| 7,072,918 B2 * | 7/2006 | Garthwaite | ............. | 707/206 |
| 7,221,650 B1 * | 5/2007 | Cooper et al. | ............. | 370/236 |
| 2003/0097608 A1 * | 5/2003 | Rodeheffer et al. | ............. | 714/7 |
| 2003/0135794 A1 * | 7/2003 | Longwell et al. | ............. | 714/42 |
| 2004/0243886 A1 * | 12/2004 | Klein | ............. | 714/42 |
| 2007/0211532 A1 * | 9/2007 | Gonzalez et al. | ............. | 365/185.11 |
| 2008/0103542 A1 * | 5/2008 | Hoyme et al. | ............. | 607/27 |

* cited by examiner

*Primary Examiner*—Bryce P Bonzo
(74) *Attorney, Agent, or Firm*—Yee & Associates, P.C.; Kenneth R. Corsello

(57) ABSTRACT

A computer implemented method, apparatus, and computer usable program code for preventing soft error accumulation. A number of cycles between references to a register are counted. Instructions are injected that reference the register for preventing soft error accumulation in response to a determination that the number of cycles is greater than a threshold.

18 Claims, 5 Drawing Sheets

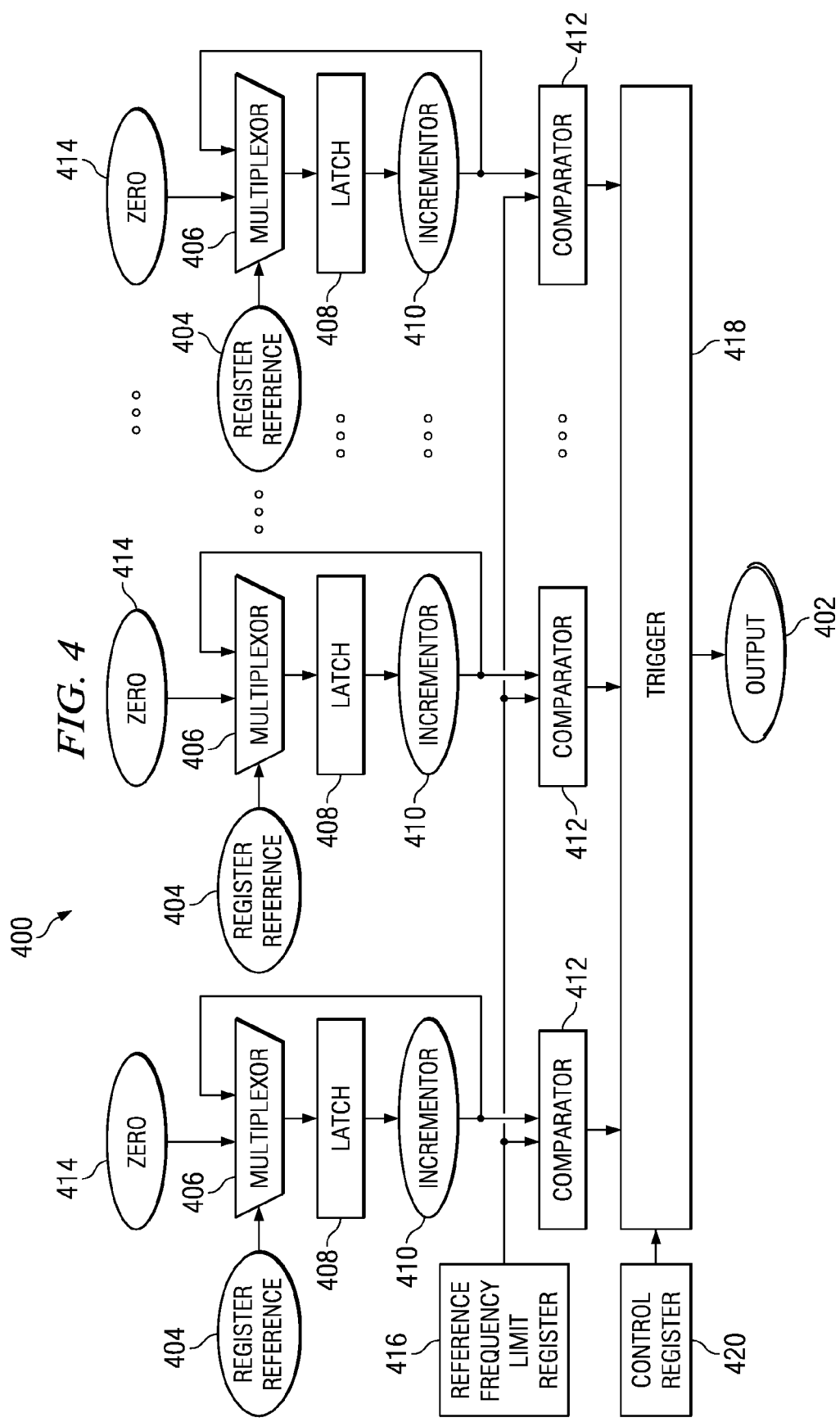

*FIG. 5*

```
BEGIN
  ↓
502 — MONITOR INSTRUCTIONS IN THE FRONT END OF THE PIPELINE
  ↓
504 — COUNT THE NUMBER OF CYCLES BETWEEN SUCCESSIVE REFERENCES TO EACH REGISTER
  ↓
506 — THE VALUE IN AT LEAST ONE OF THE COUNTERS IS OVER THE LIMIT?
   NO → 512 PROCEED WITH NORMAL INSTRUCTION ISSUE
   YES ↓
508 — INJECT INSTRUCTIONS THAT REFERENCE THE IDENTIFIED REGISTERS
  ↓
510 — UPDATE REFERENCE COUNTERS
  ↑ (loop back)
```

*FIG. 6*

```
BEGIN
  ↓
602 — MONITOR INSTRUCTIONS IN THE FRONT END OF THE PIPELINE
  ↓
604 — COUNT THE NUMBER OF CYCLES BETWEEN SUCCESSIVE REFERENCES TO EACH REGISTER
  ↓
606 — THE VALUE IN AT LEAST ONE OF THE COUNTERS IS OVER THE LIMIT?
   YES → 608 INJECT INSTRUCTIONS THAT REFERENCE THE IDENTIFIED REGISTERS
   NO ↓
612 — UNUSED ISSUE SLOTS AVAILABLE?
   NO → 616 PROCEED WITH NORMAL INSTRUCTION ISSUE
   YES ↓
614 — INJECT SOFT ERROR CHECKING OR DATA REFRESH INSTRUCTIONS TO UNUSED ISSUE SLOTS
  ↓
610 — UPDATE REFERENCE COUNTERS
  ↑ (loop back)
```

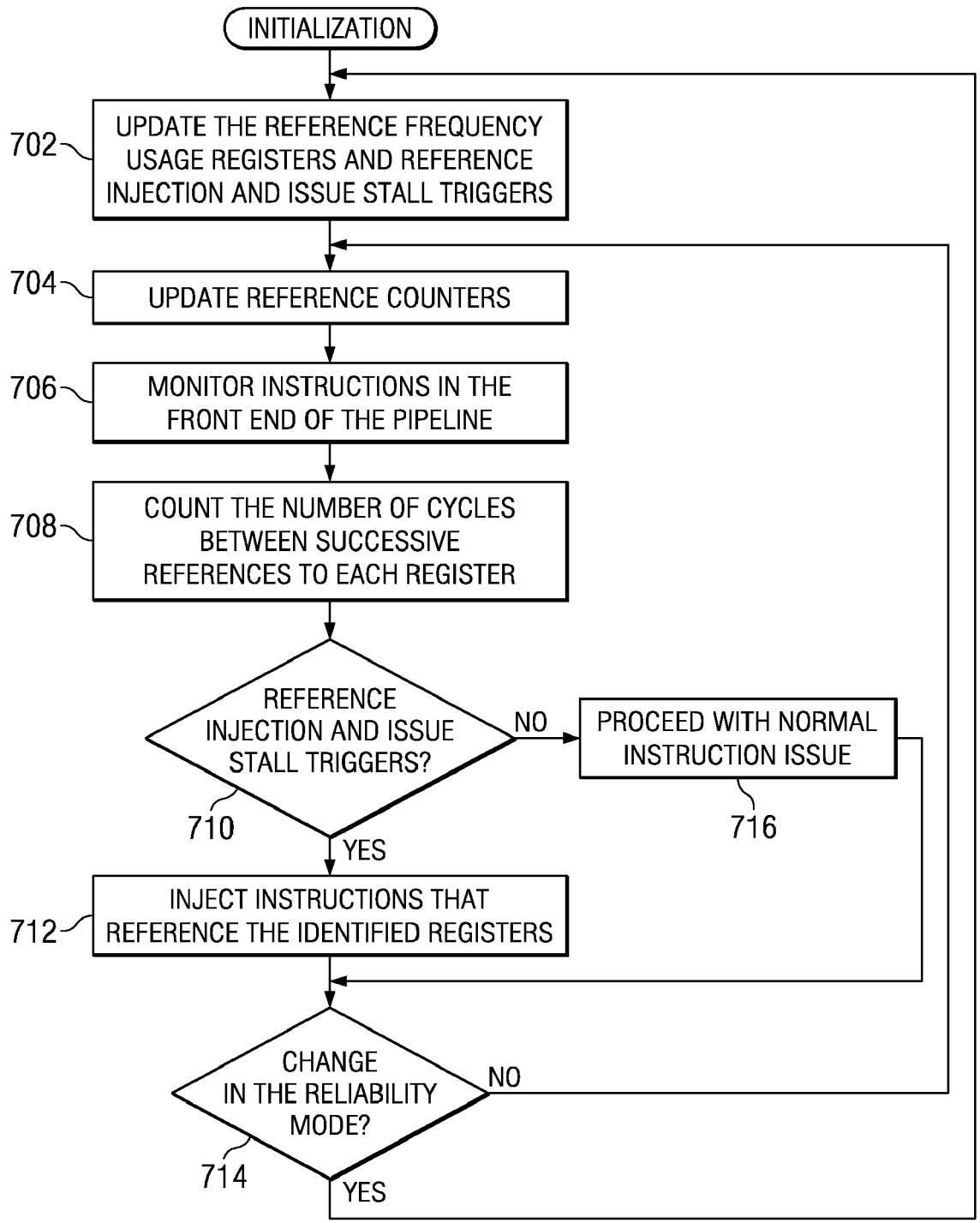

METHOD AND APPARATUS FOR PREVENTING SOFT ERROR ACCUMULATION IN REGISTER ARRAYS

This application is a continuation of application Ser. No. 11/374,871, filed Mar. 14, 2006, now U.S. Pat. No. 7,493,523.

This invention was made with Government support under Contract No.: NBCH3039004 awarded by Defense Advanced Research Projects Agency (DARPA). The Government has certain rights in this invention.

BACKGROUND OF THE INVENTION

1. Field of the Invention

The present invention relates generally to data processing, and in particular to a computer implemented method, apparatus, and computer usable program code for preventing soft error accumulation in register arrays.

2. Description of the Related Art

Use of data processing systems has grown exponentially in recent years because of the increased use of computing devices. Users have come to rely on data processing systems in every aspect of business and society. With this reliance, preventing soft errors becomes increasingly important to a system's overall performance.

Soft errors refer to errors caused by a temporary disruption of an electronic component such as a register array. A soft error is an error which is not due to any permanent physical defect in the memory system and typically involves changes to data. Many soft errors are caused by radioactive decay. Radioactive decay causes a soft error by alpha particle emission. When an unstable isotope decays, the isotope emits a positively charged alpha particle. The alpha particle may travel through an electronic component such as semiconductor memory and disturbs the distribution of electrons in the semiconductor memory. If the disturbance is large enough, a digital signal can change from a 0 to a 1 or vice versa.

Additionally, soft errors are sometimes caused by cosmic rays. Neutrons within the cosmic ray may produce unstable isotopes by neutron capture which may decay and cause a soft error.

One standard method for protecting data stored in microprocessor register arrays from soft errors is parity protection or error correction code (ECC) protection. Whenever new data is written into a register array, parity or ECC is generated and stored either in the same memory arrays as the data or in a separate memory array. A register is a circuit that holds values, operations, or input operands for logic or arithmetic operations or for address computations. These are typically operations performed by a processor and registers are typically located in processors. The register may hold values, such as an address of an instruction being executed or data being processed. Examples of registers located in a processor core include general purpose registers which hold operands for logic and integer computations or address calculations, floating point registers which hold operands for floating point computations, program counter registers which point to the locations in the memory for fetching instructions, conditional registers which hold values used for calculating conditions for branches, various special purpose registers, such as interrupt vector register, machine status register, link registers. Registers may also be located in any other component of the computers system, such as cache, memory controller, Input/Output controller, network adapter, fabric logic.

For parity protected arrays, whenever data is read out of the register file, the parity bit is calculated and compared against the corresponding parity bit read out from the appropriate parity storage array. In case of a mismatch, an error is reported and the processor takes an appropriate corrective action of check stops.

For ECC protected arrays, whenever data is read out of the register file, the register file that stores the ECC bits supplies the ECC bits corresponding to the data item, and the read data undergoes ECC correction.

The common problem with error protection mechanisms is that only a limited number of bit flips in any data item may be detected or corrected. For example, in the case of a parity protected data item, any even number of bit flips does not change the parity function, and therefore will go undetected in some systems. In other systems even if the even number of bit flips is detected, the error may not be correctable. This problem is further referred to as soft error accumulation. Soft error accumulation often results in data errors such as computational errors, application failures, and necessary reboots of a data processing system.

SUMMARY OF THE INVENTION

The aspects of the present invention provide a computer implemented method, apparatus, and computer usable program code for preventing soft error accumulation. A number of cycles between references to a register are counted. Instructions are injected that reference the register for preventing soft error accumulation in response to a determination that the number of cycles is greater than a threshold.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram of data processing components for preventing soft error accumulation in accordance with an illustrative embodiment of the present invention;

FIG. 5 is a flow diagram of a system for preventing soft error accumulation in accordance with an illustrative embodiment of the present invention;

FIG. 6 is a flow diagram of a system for preventing soft error accumulation in accordance with an illustrative embodiment of the present invention;

FIG. 7 is a flow diagram of a system for preventing soft error accumulation in accordance with an illustrative embodiment of the present invention.

DETAILED DESCRIPTION OF THE PREFERRED EMBODIMENT

Figure 1:
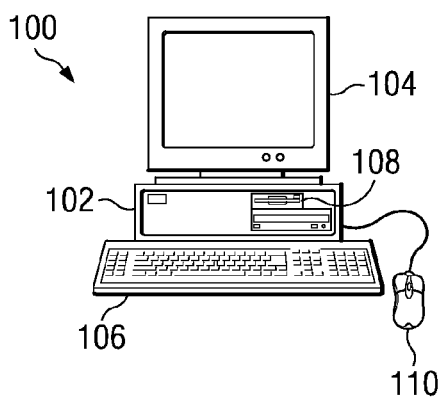
FIG. 1 is pictorial representation of a data processing system in which the aspects of the present invention may be implemented.

With reference now to the figures and in particular with reference to FIG. 1, a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
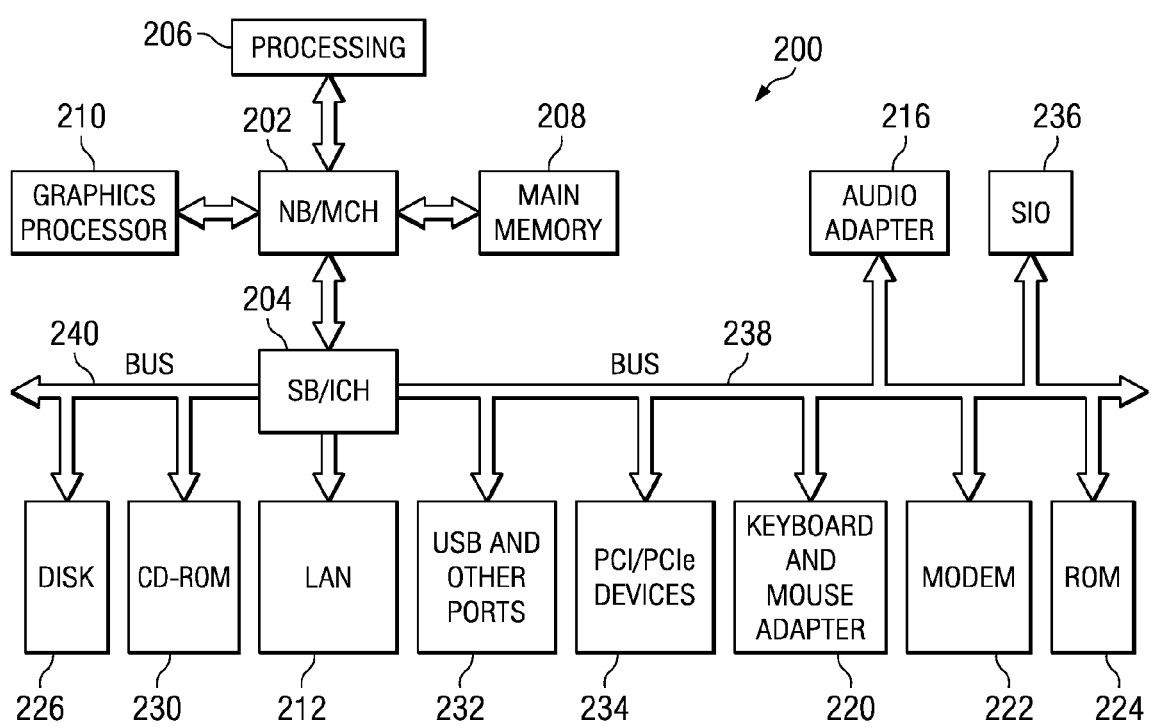
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. The bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program code for preventing soft error accumulation in register arrays. This type of prevention is accomplished by bounding the time interval between references to any data element stored in a register array. A register reference or access refers to reading or writing to a data element or value within the register and is generally measured in terms of time, clock cycles, and instruction cycles of the data processing system. The time interval is bound if a register has not been accessed within a specified time period or threshold, instructions are injected that refresh the data values in the register. Soft errors refer to an error caused by a temporary disruption of electronic components such as a register array. A soft error is an error which is not due to any permanent physical defect in the memory system and typically involves changes to data. Many soft errors are caused by the radioactive decay of unstable isotopes. Alpha particles emitted by the unstable isotope may cause electron disturbances sufficient to alter a data element in electronic components.

In one embodiment, a control unit monitors the usage of each data element stored in an error correction code (ECC) protected register array. The control unit invokes a data refresh of the register when the number of cycles passed since the last access to the particular register exceeds the value in a program-updatable register. The instruction cycle or cycle is the time period between two consecutive clock cycles which synchronize the operation of all processor components. As a result, each register may be updated or refreshed periodically to prevent soft error accumulation. The frequency of refresh for each register may be user defined, specified based on a policy, static, or dynamically established.

Alternatively, refresh instructions may also be injected whenever issue slots are available. In this embodiment, the threshold is zero cycles and as a result, the registers may be refreshed anytime without having to wait for a specified threshold. Stalls may also be issued to create empty slots when none are available. A register refers to at least one register or multiple registers in a register array.

Figure 3:
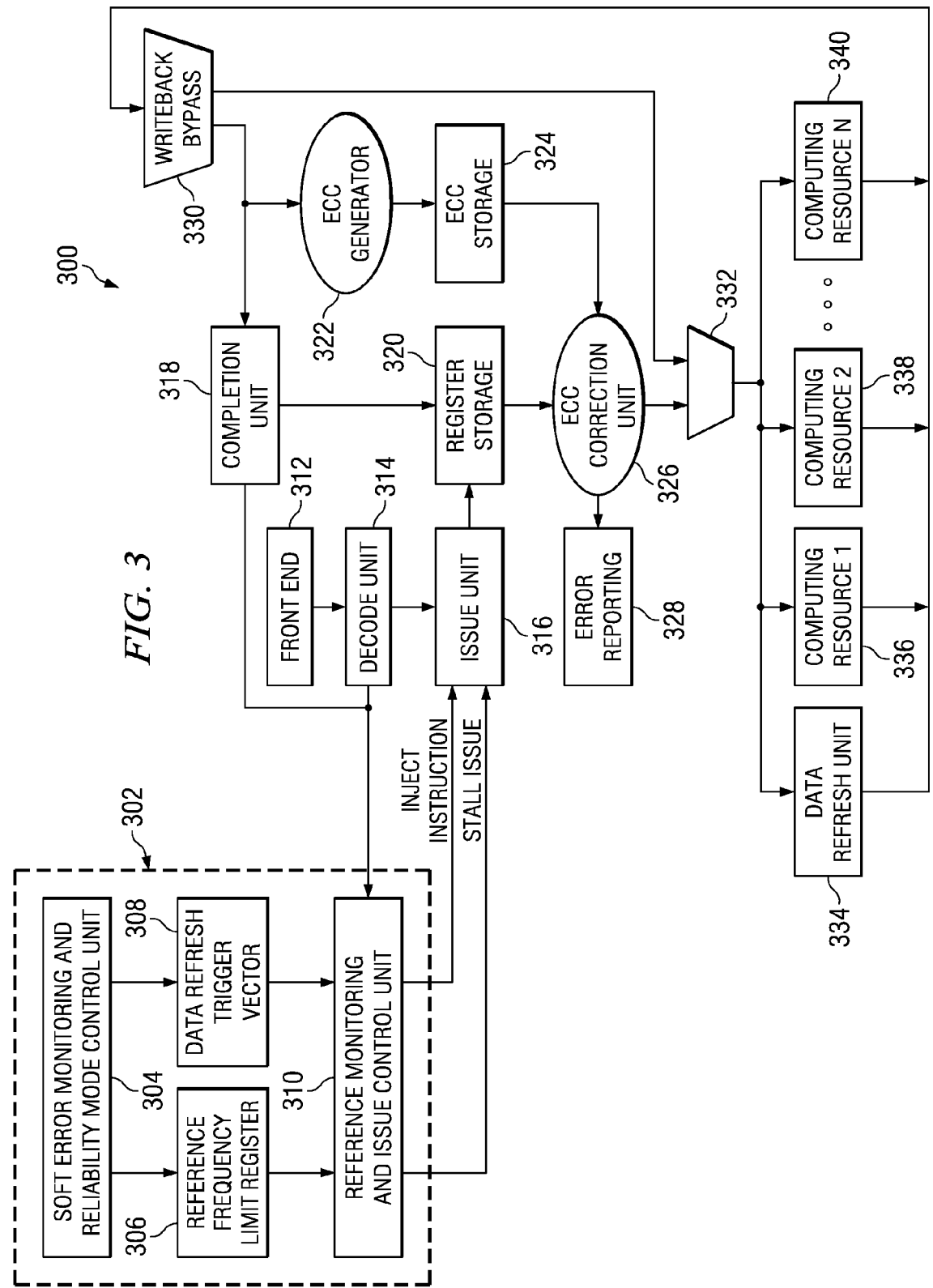
FIG. 3 is a block diagram of data processing components for preventing soft error accumulation in accordance with an illustrative embodiment of the present invention.

FIG. 3 is a block diagram of data processing components for preventing soft error accumulation in accordance with an illustrative embodiment of the present invention. Error correction system 300 may be used to prevent soft error accumulation in a data processing system such as data processing system 100 of FIG. 1. Error correction system 300 may be incorporated in any component of a data processing system including, for example, processor 206, north bridge and memory controller 202, south bridge and I/O controller hub 204, and graphics processor 210 of FIG. 2. Soft error control components 302 determine which data elements are monitored and how often the data elements are refreshed. Soft error control components 302 include soft error monitoring and reliability mode control unit 304, reference frequency limit register 306, data refresh trigger vector 308, and reference monitoring and issue control unit 310.

In one illustrative embodiment, the usage monitoring and control function is implemented in reference monitoring and issue control unit 310. Soft error monitoring and reliability mode control unit 304 determines a soft error correction policy. The soft error correction policy establishes which registers are monitored, a threshold, and the refresh rate of each register. The threshold is the maximum number of cycles or time that a register should go without being accessed, checked and refreshed. The refresh rate is the minimum frequency that the specified register is to be refreshed to reduce the probability of soft error accumulation to an acceptable level. Access refers to reading or writing to a data element or value within the register. The soft error correction policy may be established by a user, hardware configuration, operating system or hypervisor in some examples. Static and dynamic factors including application priority, criticality, altitude (frequency of cosmic rays), processor utilization, error rate, and other system or external factors may be used to establish the soft error correction policy.

Soft error monitoring and reliability mode control unit 304 may function in any number of ways. The soft error correction policy may be established during boot up or initialization. For example, the user may establish that no register may be inactive for more than 10,000 cycles. Alternatively, the operating system may establish the soft error correction policy based on the criticality of the application, or priority of operations that may be associated with each register.

In another example, soft error monitoring and reliability mode control unit 304 may dynamically establish the soft error correction policy based on factors such as those listed above. For example, if the data has a high priority or is system critical, the soft error correction policy of soft error monitoring and reliability mode control unit 304 may require that the data be refreshed at a threshold of every 200 cycles if not accessed. Different thresholds may be established for each register based on the soft error correction policy. In another embodiment, the soft error correction policy may be static. For example, in a location such as Denver, Colo., that is more susceptible to cosmic rays because of altitude, the soft error correction policy may establish that all register values are to be refreshed if not accessed every 800 cycles.

Soft error monitoring and reliability mode control unit 304 establishes the threshold in reference frequency limit register 306. Reference frequency limit register 306 holds the threshold for one or more registers. There may be any number of reference frequency limit registers 306, each of which may have a different threshold. The threshold of reference frequency limit register 306 may be compared against a usage counter or latch value. The usage counter indicates how many cycles have passed since the most recent reference or data access to the specified register.

Data refresh trigger vector 308 may be used to programmably control when and how refresh instructions are injected by reference monitoring and issue control unit 310. For example, data refresh trigger vector 308 may instruct reference monitoring and issue control unit 310 to only inject refresh instructions for specified registers when there are available issue slots. In another example, data refresh trigger vector 308 may issue a stall if there are no issue slots available for refresh instructions. As a result, data refresh trigger vector 308 controls whether the refresh instructions are injected, even if the processor and corresponding issue slots are fully utilized.

Front end 312 fetches instruction from the instruction memory, such as instruction cache. Front end may predict the outcome of branches and other instructions modifying the instruction flow in order to proceed with the fetching of instruction before instructions modifying the control flow are executed. Front end 312 sends new instructions to decode unit 314.

Decode unit 314 monitors instructions being sent to issue unit 316 for processing by one or more functional units. Decode unit 314 indicates whether there are any issue slots that are not filled with instructions. For example, during an idle cycle when instruction issue is stalled because of a cache miss or intra-instruction dependency or execution of a branch instruction, decode unit 314 informs reference monitoring and issue control unit 310 of the issue slots in which refresh instructions may be inserted.

Reference monitoring and issue control unit 310 monitors information within soft error control components as well as from front end 312, decode unit 314, and completion unit 318. In another embodiment reference monitoring and issue control unit 310 may connect to completion logic, which may be useful for processor with speculative instruction issue. In processors with speculative instruction issue, register references by instructions flushed from the pipeline before the instructions reach the pipeline stage during which the register is accessed do not count as a register access.

The purpose of completion unit 318 is to keep track of instruction execution and completion, and to make sure that instructions update the architectural state in the sequence consistent with the program order. Completion unit 318 also keeps track of which instructions have successfully passed through the register access stage of the processor pipeline. The described interaction with the completion logic allows the reference monitoring and issue control unit 310 to account for register file references and refreshes done by those instructions that have been flushed from the pipeline because of control flow mis-speculations, such as wrong predictions of the branch outcomes done by front end 312 of the pipeline.

Reference monitoring and issue control unit 310 injects a refresh instruction into issue unit 316 that references a specified register when the value in the usage counter, which is the number of cycles passed since the last access to that register, exceeds the value in the reference frequency limit register 306. The refresh instructions ensure that the register value is correct by reading data out of the register, checking data for errors either by calculating parity or doing error code correction, fixing the data using error code correction and writing the corrected value back into the register.

In this way, refresh instructions ensure that the value written back to the register is free of soft errors. In one embodiment, instructions injected for refreshing the register values may be instructions from the instruction set architecture of the processor which has no impact on the architectural state or on the execution of the program. For example, the injected instruction may be OR r1, r1, r1, a function of register r1 with itself wherein the result is written back into the same register, r1. Using an OR function allows the specified register to be refreshed without materially changing the data. Using instructions from the instruction set architecture for refreshing register values has an advantage of minimizing the amount of changes to the baseline processor needed to implement the current invention. These instructions are executed in the corresponding computing resources existing in baseline design. For example the OR r1, r1, r1 instruction are executed in the arithmetic logical unit or ALU.

Reference monitoring and issue control unit 310 inserts refresh instructions into issue slots when unused issue slots are available. As a result, issue slots are injected with instructions to refresh data without affecting processing performance. When issue slots are not available, reference monitoring and issue control unit 310 may be set to issue a command to stall the issue of instructions. The issued stall creates issue slots so that refresh instructions may be injected to refresh specified registers. The stall issue may also specify the number of cycles required to process refresh instructions injected by reference monitoring and issue control unit 310.

Reference monitoring and issue control unit 310 may keep a queue of registers that need to be refreshed in the event that issue slots are not available for all of the refresh instructions pending.

Refresh instruction injection may be performed in numerous modes based on soft error control components 302. In one mode, data refresh instructions may be injected only if requested by data refresh trigger vector 308, that is, only if the number of cycles since the last refresh of data has exceeded the limit for that register specified by reference frequency limit register 306. In other words, data refresh instructions are not injected into the pipeline until the value in one of the registers has been stored long enough to have accumulated a sufficient number of soft errors to cause a program execution error. As a result, registers will not be refreshed unless the probability of causing a program execution error due to soft error accumulation is above the limit specified by reference frequency limit register 306. Such policy for injecting data refresh instructions is referred to as "lazy" policy.

In another mode, data refresh instructions are injected whenever unused issue slots are available, regardless of whether there is a potential danger for causing a program execution error due to soft error accumulation. Such policy for injecting data refresh instructions is referred to as "eager" policy. Reference monitoring and issue control unit 310 issues refresh instructions for registers that have passed the most cycles without being refreshed.

In another mode, data refresh instructions may be injected only if requested by data refresh trigger vector 308 and there are available issue slots. Only unused issue slots are injected with refresh instructions. As a result, some registers will not be refreshed until issue slots become available to inject the instruction. This mode improves the system reliability without any impact on the processor performance. Such mode for injecting data refresh instructions is referred to as "aggressive" mode.

In another mode, data refresh instructions are injected regardless of whether there are unused issues slots. If no unused issue slots are available, issue stalls are injected. For example, if the processor is fully utilized, a stall is issued to inject the refresh instructions. This mode better prevents soft error accumulation at the expense of processor performance. Such mode for injecting data refresh instructions is referred to as "safe" mode.

Error control system 300 may switch between the "aggressive" and "safe" modes and between the "eager" and "lazy" data refresh instruction injection policies during the initialization procedure or dynamically during program execution. For example, if the number of errors reaches a performance limit, soft error monitoring and reliability mode control unit 304 may issue stalls so that refresh instructions may be injected. Any combination of "aggressive" and "safe" mode and "eager" and "lazy" policies may be implemented by embodiments of this invention in combinations herein referenced as modes.

Issue unit 316 communicates with register storage 320 by sending instructions to read out operands from register storage 320. Register storage 320 houses the registers or register array referenced by the microprocessor. Each register is a storage device having a specified storage capacity such as a bit, byte, or computer word, and may be intended for a special purpose or general memory processes, such as for use by the microprocessor. ECC generator 322 generates code used to correct data errors in memory. The error correction code (ECC) created by ECC generator 322 is in ECC storage 324. In another embodiment, the error correction code can be stored in the same storage as used for storing the data values such as register storage 320. Error code correction is performed in ECC correction unit 326 by calculating the error correction function on data and the corresponding error correction code bits. Error reporting 328 reports any errors found by ECC correction unit 326. Error reporting 328 may be used to implement a response which may include correcting the error, diagnosing a problem, and/or restarting the system.

Results from ECC correction unit 326 and writeback bypass 330 are multiplexed through bypass 332 to data refresh unit 334, and any number of computing resources including for example, computing resource 1 336, computing resource 2 338, and computing resource N 340. Computing resources such as computing resource 1 336, computing resource 2 338, and computing resource N 340, may be any number of functional components used by a microprocessor to perform computations. For example, computing resource 1 336 may be a floating point unit, a code arithmetic logic unit (ALU), memory access unit, or branch unit. Data refresh unit 334 which is an essential element of the present invention is used to refresh a specified register. Additionally, if data refresh unit 334 finds an error, data refresh unit 334 corrects the error and writes the corrected result back into the register storage 320. The corrected data value may also be made available to subsequent instructions through writeback bypass 330. Writeback bypass 330 may be implemented as a collection of multiplexors. The purpose of bypass 332 is to make the computed values at the outputs of the computing resource 1 336, computing resource 2 338, computing resource N 340 and data refresh unit 334 available to subsequent instructions in the pipeline before the computed values are written into register storage 320. If an operand required by an instruction issued for execution is available in register storage 320, for example, if the operand had been computed and written back into the register storage before the instruction reading the operand was issued. Then the bypass logic of writeback bypass 330 and bypass 332 connect the input of the corresponding computing resource to which the instruction was issued for execution to the corresponding output of register storage 320. Otherwise, if the computed value had not been written into register storage 320 when the instruction that needs the value was issued for execution, writeback bypass 330 forwards the computed value to the input of the computing resource through bypass 332. Some embodiments of this invention may merge the functions of data refresh unit 334 and ECC correction unit 326 into a single unit.

The instructions injected for refreshing the register values may be new instructions implemented specifically for the purpose of refreshing register values. These instructions are executed in data refresh unit 334.

In one example, various operands are read from register storage 320 and each operand is checked for soft errors in ECC correction unit 326. Any errors are reported to error reporting 328 without writing any of the registers in register storage 320. The register with soft errors may be corrected by data refresh unit 334 during a storage refresh cycle. The corrected values are passed back through writeback bypass 330 and completion unit 318 into the register file in register storage 320. Alternative embodiments may not implement writeback bypass 330, or completion unit 318, but may instead connect the outputs of the computing resources directly to the write ports of register storage 320.

In another example, reference monitoring and issue control unit 310 issues data refresh instructions as soon as the instructions are triggered by the corresponding reference frequency limit register 306. Because the data refresh instruction writes a new value into the register file, issue unit 316 monitors the data dependency between any instruction that is younger than the data refresh instruction. The instruction with data dependency may need to be stalled and issued later, after the dependency is resolved. In other words, the instruction is issued after the computed or refreshed data value is available in register storage 320, or available through the writeback bypass 330. The data refresh instructions provide no value other than data refresh, as a result in some embodiments data refresh instructions may be issued at any time and should not cause any dependency stalls for instructions that are younger than the data refresh instructions. In other words, instructions issued by issue unit 316 do not need to be checked for dependencies on the output of the injected data refresh instructions.

In yet another example, the trigger for injection of data refresh and soft error check instructions is a more complicated function of data refresh trigger vector 308 and the usage counter vector. For example, trigger=f(trigger_vector<0:n>, usage_counter_vector<0:m>), where data refresh trigger vector 308 is programmably controlled register that is applied to the data refresh trigger logic. For example, data refresh trigger vector 308 may block stalls needed to refresh data in certain registers, such as those which are either not used by the program, or are not likely to cause a program error due to the accumulation of soft errors.

In another example, data refresh trigger vector 308 may assign different weights to the usage counters for different registers because soft error accumulation in some registers may be more dangerous than in others. Such difference between the degree of danger of soft error accumulation between different registers may occur either because of the specifics of a program, for example, a particular program may not use some of the registers or because of differences in the implementation of different registers. For example, some registers may be implemented as static random access memory (SRAM) cells which are more likely to loose data in case of a particle strike, other registers may be implemented as latches which are typically more robust than static random access memory cells.

Illustrative embodiments also allow dynamic adjustments to data refresh trigger vector 308 needed to react to changes in temperature, error detection rate, power supply or any other environment factors. By programmably changing the data in data refresh trigger vector 308 the processor may adjust the rate of injection of the data refresh instruction to the needs of a particular program.

FIG. 4 is a block diagram of data processing components for preventing soft error accumulation in accordance with an illustrative embodiment of the present invention. Data reference monitoring system 400 is a more detailed block diagram of a soft error control components such as soft error control components 302 of FIG. 3. Data reference monitoring system 400 determines whether to create output 402. Output 402 may inject instructions that reference a specified register or request a stall so that instructions may be inserted into issue slots.

Register reference 404 is a control signal that indicates whether a specified register has been accessed. Register reference 404 is a control signal to multiplexor 406. Register reference 404 is asserted with every clock cycle of the data processing system. For example, if the register has not been referenced during a clock cycle register is a voltage low or zero value. If the register has been referenced, register reference 404 is a voltage high or one value. Multiplexor 406 has a single output operably connected to latch 408. Latch 408 functions as a counter by keeping track of the value passed into latch 408 from multiplexor 406. Latch 408 is operably connected to incrementor 410. Incrementor 410 adds one to the value passed from latch 408. Incrementor 410 is operably connected to an input of both comparator 412 and multiplexor 406.

Zero 414 is the other input into multiplexor 406. Register reference 404 passes zero 414 through multiplexor 406 each time register reference 404 indicates that the specified register was accessed. As a result, zero 414 is stored in latch 408 and the count of cycles begins again at zero. Register reference 404 passes value of latch 408 plus one through the output of incrementor 410 each time register reference 404 indicates that the specified register was not accessed. As a result, the value stored in latch 408 is reset to zero each time register reference 404 indicates that the specified register was accessed. Similarly, the value stored in latch 408 increments each time register reference 404 indicates that the specified register was not accessed. There are various other hardware and software configurations, including counters that may be used to count the number of cycles that pass before the specified register is accessed. Reference frequency limit register 416 is also operably connected to comparator 412. Reference frequency limit register 416 may be a limit register, such as reference frequency limit register 306 of FIG. 3. If the value passed to comparator 412 by incrementor 410 is greater than the value stored in reference frequency limit register 416, comparator passes a trigger value to trigger 418.

Trigger 418 uses the value from comparator 412 as an indication that the specified register needs to be refreshed. Any number of registers may be monitored using various register references, zeros, multiplexors, latches, incrementors, and comparators. In one embodiment, reference frequency limit register 416 may be a reference for numerous comparators. In another embodiment, reference frequency limit register 416 may be assigned to a single comparator 412. In yet another embodiment, reference frequency limit register 416 may be used by a group of comparators based on priority, criticality, or other grouping. For examples, registers with highly critical values may be assigned a reference frequency limit register 416 of one-hundred cycles to ensure that the values within those registers are updated at least once every one-hundred cycles.

Reliability mode control register 420 may be used to dynamically control if, how, and when stalls are issued and instructions are injected as well as the threshold stored in reference frequency limit register 416. Reliability mode control register 420 may be used to incorporate logic and control information such as data refresh trigger vector 308 of FIG. 3 or reference monitoring and issue control unit 310 of FIG. 3.

FIG. 5 is a flow diagram of a system for preventing soft error accumulation in accordance with an illustrative embodiment of the present invention. The process illustrated in FIG. 5 may be implemented in a soft error correction system, such as error correction system 300 of FIG. 3. FIG. 5 illustrates a flow diagram implementing a "lazy" or reactive policy. No instructions are injected until data refresh is overdue in one of the registers. The process begins as the reference monitoring and issue control unit monitors instructions in the front end of the pipeline (step 502).

The process counts the number of cycles between successive references for each register (step 504). Step 504 may be implemented using components such as register reference 404, zero 414, multiplexor 406, latch 408, and incrementor 410 of FIG. 4. Next, the process determines if the value in at least one of the counters is over the limit (step 506). The limit is the threshold established for each counter and may be stored in a limit register such as reference frequency limit register 416 of FIG. 4. Step 506 may be implemented in a comparator such as comparator 412 of FIG. 4.

If the value in the counter is over the limit, the process injects instructions that reference the identified register (step 508). For example, the injected instructions may be a logical OR of the specified register value with itself with the resulting value stored back into the specified register. This injected instruction refreshes the value within the register without changing the value stored in the register. The instructions may be inserted by a trigger such as trigger 418 of FIG. 4. The process updates the register reference counters (step 510) before returning to monitor instructions in the front end of the pipeline (step 502). The register reference may be a control signal such as register reference 404 of FIG. 4. The register reference may be used to update a counter or latch such as latch 408 of FIG. 4.

If the value in the counters is not over the limit in step 506, the process proceeds with normal instruction issue (step 512) before updating the register reference counters (step 510). The process then returns to step 502.

The flow diagram of FIG. 5 illustrates a soft error correction system wherein data refresh instructions are injected only if the number of cycle since the last refresh of data has exceeded the limit for that register specified by the reference frequency limit register. In other words, data refresh instructions are not injected into the pipeline until the value in one of the register has been stored long enough to potentially accumulate a sufficient number of soft errors to cause a program execution error. As a result, registers will not be refreshed unless the probability of causing a program execution error due to soft error accumulation is above the limit specified for this application. Such policy for injecting data refresh instructions is referred to as "lazy" policy.

FIG. 6 is a flow diagram of a system for preventing soft error accumulation in accordance with an illustrative embodiment of the present invention. The process illustrated in FIG. 6 may be implemented in a soft error correction system, such as error correction system 300 of FIG. 3. FIG. 6 illustrates an embodiment implementing an "eager" or proactive policy. Refresh instructions are injected whenever there is an opportunity to do so with out slowing down the processor, even if none of the registers need an immediate refresh.

The process begins as the reference monitoring and issue control unit monitors instructions in the front end of the pipeline (step 602).

The process counts the number of cycles between successive references for each register (step 604). Step 604 may be implemented using components such as register reference 404, zero 414, multiplexor 406, latch 408, and incrementor 410 of FIG. 4. Next, the process determines if the value in at least one of the counters is over the limit (step 606). Step 606 may be implemented in a comparator such as comparator 412 of FIG. 4.

If the value in the counter is over the limit, the process injects instructions that reference the identified registers (step 608). The instructions may be inserted by a trigger such as trigger 418 of FIG. 4. The process updates the register reference counters (step 610) before returning to monitor instructions in the front end of the pipeline (step 602). The register reference may be an asserted control signal such as register reference 404 of FIG. 4. The update register reference counters of step 610 may be used to update a counter or latch such as latch 408 of FIG. 4.

If the value in the counters is not over the limit in step 606, the process determines if there are unused issue slots available (step 612). The determination of step 612 may be made by a trigger such as trigger 418 of FIG. 4. If there are unused issue slots, the process injects soft error checking or data refresh instructions to unused issue slots (step 614).

The injected instructions may be specially implemented data refresh instructions that are used to refresh registers that were least recently updated. The injected instructions may also be instructions existing in the baseline processor which do not have any impact on the execution of the program or the state of the processor. Next, the process updates register reference counters (step 610) and returns to step 602. If there are no unused issue slots in step 612, the process proceeds with normal instruction issue (step 616) before updating the register reference counters (step 610).

The flow diagram of FIG. 6 illustrates a soft error correction system wherein data refresh instructions are injected whenever unused issue slots are available, regardless of whether there is a potential danger for causing a program execution error due to soft error accumulation. Such policy for injecting data refresh instructions is referred to as "eager" policy.

FIG. 7 is a flow diagram of a system for preventing soft error accumulation in accordance with an illustrative embodiment of the present invention. The process illustrated in FIG. 7 may be implemented in a soft error correction system, such as error correction system 300 in FIG. 3. FIG. 7 is an embodiment that illustrates the use of updatable reliability mode registers such as control register 420 of FIG. 4.

The process begins with initialization of the system. The process first updates the reference frequency usage registers, reference injection, and issue stall triggers (step 702). Step 702 may be implemented in a control component such as soft error monitoring and reliability mode control unit 304 of FIG. 3. Next, the process updates register reference counters (step 704). The process monitors instructions in the front end of the pipeline (step 706). The process counts the number of cycles between successive references to every register (step 708). Next, the process determines if there are reference injection and issue stall triggers (step 710). Step 710 may be implemented by checking the value at the output of a reference monitoring and control unit such as reference monitoring and issue control unit 310 of FIG. 3. If there are reference injection and issue stall triggers indicating that a data refresh instruction needs to be injected, the process injects instructions that reference the identified registers (step 712).

Next, the process determines whether to change the reliability mode (step 714). The determination of step 714 may be performed by a control register such as control register 420 of FIG. 4. For example, if too many errors are occurring in the registers, the control register may change the reliability mode by decreasing the threshold stored in the reference frequency limit registers. If the process determines to change the reliability mode, the process updates the reference frequency usage registers and reference injection and issue stall triggers (step 702).

If there are no reference injection and issue stall triggers in step 710, the process proceeds with normal instruction issue (step 716) and then returns to step 714 as described above.

Thus, aspects of the present invention provide a method, apparatus, and computer usable program code for preventing soft error accumulation in register arrays. If an identified register has not been accessed for a specified number of cycles, an instruction is injected to refresh the identified register. The instructions may be injected based on available issue slots or stalls may be issued in order to create issue slots for refresh instructions. By requiring that registers be refreshed at a specified threshold, multiple bit flips within the register are less likely to occur minimizing soft error accumulation, and reducing the likelihood of multi-bit errors that cannot be corrected by the error correction logic. Additionally, data items may be dynamically refreshed to better protect sensitive or critical data, adjust the level of protection to the environment, and set the desired balance between the level of protection and the impact on the processor performance according to the requirements of the application running on the system.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for preventing soft error accumulation, the computer implemented method comprising:

counting a number of cycles between references to a register;

responsive to a determination that the number of cycles is greater than a threshold, injecting instructions that reference the register for preventing soft error accumulation;

determining whether empty issue slots are available for the instructions; and responsive to determining that empty issue slots are unavailable for the instructions, issuing a stall to a processor to make empty issue slots available.

2. The computer implemented method of claim 1, wherein the injecting step further comprises:

determining a processor utilization.

3. The computer implemented method of claim 1, wherein the injecting step further comprises:

responsive to determining that empty issue slots are available for the instructions, injecting the instructions into the empty issue slots.

4. The computer implemented method of claim 1, wherein the injecting step comprises:

responsive to determining that empty issue slots are available for the instructions, injecting instructions that reference the register for preventing soft error accumulation, wherein the threshold is zero cycles.

5. The computer implemented method of claim 1, wherein the threshold is selected from the group of by a user, statically, and dynamically.

6. The computer implemented method of claim 1, wherein the stall is issued according to a policy.

7. The computer implemented method of claim 6, wherein the threshold and the policy is adjusted dynamically for maximizing performance of the data processing system and soft error accumulation.

8. The computer implemented method of claim 1, wherein the injecting step further comprises:

performing error code correction on the register for detecting soft errors in the register.

9. The computer implemented method of claim 1, further comprising:

monitoring instructions to be executed by the processor; and responsive to a determination that the number of cycles is less than the threshold, performing normal instruction issue.

10. The computer implemented method of claim 1, further comprising:

updating a register reference for indicating when the register was last accessed; and responsive to the register being referenced, passing a reset value to the register reference to reset the number of cycles.

11. The computer implemented method of claim 1, further comprising:
injecting instructions wherein the instructions access the register so that data elements in the register are refreshed.

12. The computer implemented method of claim 1, wherein the register is a plurality of registers, and the instructions is a plurality of instructions wherein each of the plurality of instructions may reference one of the plurality of registers.

13. An apparatus comprising:
a register counter for counting a number of cycles between references to a register;
a limit register operably connected to the register counter for specifying a threshold;
a comparator operably connected to the register counter and the limit register, wherein the comparator generates an injection trigger when a value in the register counter is greater than the limit register;
a trigger operably connected to the comparator, wherein the trigger injects instructions referencing the register in response to receiving the injection trigger; and
a control register operably connected to the trigger, wherein the control register determines whether empty issue slots are available for the instructions, and wherein the control register instructs the trigger to issue a stall to a processor to make empty issue slots available in response to determining that empty issue slots are unavailable for the instructions.

14. The apparatus of claim 13, further comprising:
a data refresh unit for refreshing values in the register in response to receiving the instructions.

15. The apparatus of claim 13, wherein the control register dynamically adjusts the threshold based on processor utilization.

16. The apparatus of claim 13, wherein the control register allows the trigger to inject instructions only when empty issues slots are available.

17. A computer program product comprising a computer usable medium including computer usable program code for preventing soft error accumulation, said computer program product including:
computer usable program code for counting a number of cycles between references to a register;
computer usable program code responsive to a determination that the number of cycles is greater than a threshold, for injecting instructions that reference the register for preventing soft error accumulation;
computer usable program code for determining whether empty issue slots are available for the instructions; and
computer usable program code responsive to determining that empty issue slots are unavailable for the instructions, for issuing a stall to a processor to make empty issue slots available.

18. The computer program product of claim 17, comprising computer usable program code for injecting instructions according to a first mode, a second mode, a third mode, and a fourth mode;
wherein in the first mode the instructions are injected whenever the number of cycles is greater than the threshold;
wherein in the second mode the instructions are injected whenever an empty issue slot is available;
wherein in the third mode the instructions are injected whenever the number of cycles is greater than the threshold and the empty issue slot is available; and
wherein in the fourth mode a stall is issued based on processor performance and a number of soft errors wherein the stall creates empty issue slots for injecting the instructions.

* * * * *